July 16, 1940.  W. F. JONES  2,208,189
KING BOLT AND BUSHING
Filed Sept. 6, 1939

Inventor
Walter F. Jones
By Mawhinney & Mawhinney
Attorneys.

Patented July 16, 1940

2,208,189

UNITED STATES PATENT OFFICE 2,208,189

KING BOLT AND BUSHING

Walter F. Jones, East Hampton, Conn., assignor of one-half to Edward S. Zawisza, Hebron, Conn.

Application September 6, 1939, Serial No. 293,634

4 Claims. (Cl. 280—96.1)

The present invention relates to improvements in king bolts and bushings and has for an object to provide a permanent king bolt and bushings assembly fitted in the front arm of the steering mechanism of automobiles, the purpose of which is to prevent "shimmying" and to take up the wear that occurs without requiring the replacing of the king bolt or bushings or the removing of the king bolt or bushings.

It is another object of the invention to provide an improved front wheel assembly for automobiles involving a permanent king bolt constructed and adapted for adjustment from time to time to compensate for, and take up, the wear that has occurred in the bearings and the bushings due to the steering movement of the front wheel and its steering arm.

A further object of the invention is to provide an improved construction of king bolt and bushings and cooperating locking bolt which will permit of the relative vertical or axial movement of the king bolt necessary to its adjustment in the act of tightening the bushings.

The invention has for a further purpose to accomplish the objects above described in a simple form of king bolt and bushings that can be manufactured, installed and assembled at relatively low manufacturing and labor costs.

With the foregoing and other objects in view, the invention will be more fully described hereinafter, and will be more particularly pointed out in the claims appended hereto.

In the drawing, wherein like symbols refer to like or corresponding parts throughout the several views.

Figure 1:
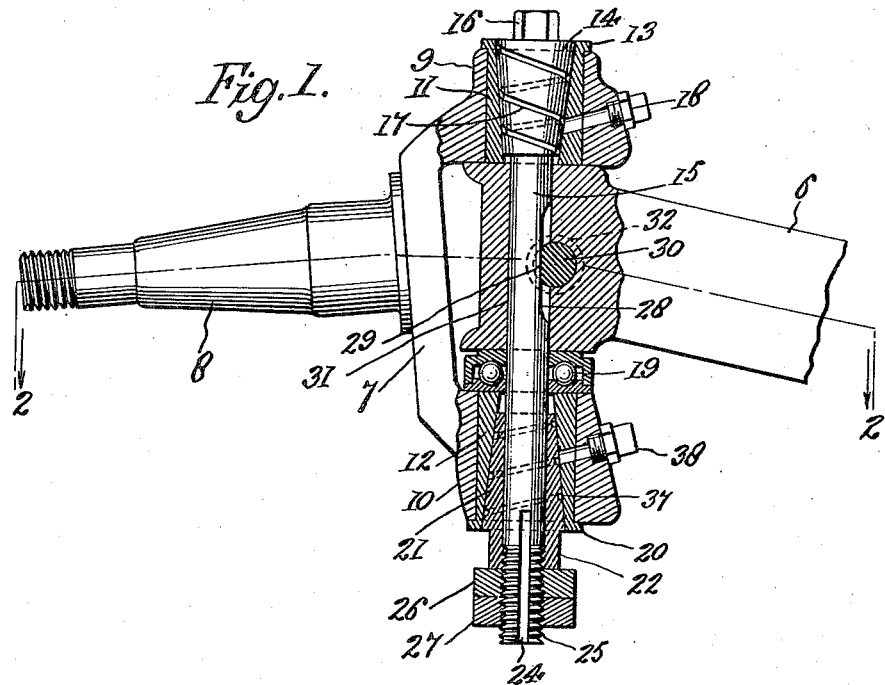
Figure 1 is a fragmentary front elevation, with parts broken away and parts shown in section, of an axle, steering knuckle and king bolt and bushing assembly constructed in accordance with the present invention.
Figure 2:
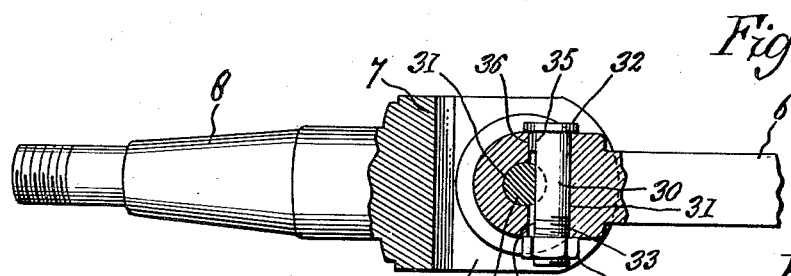
Figure 2 is a horizontal section taken substantially on the line 2—2 in Figure 1.

Referring more particularly to the drawing, 6 represents the front axle of an automobile or other vehicle upon which the weight of the vehicle body is supported; and 7 represents the steering knuckle involving the spindle 8 upon which the road wheel is journaled. The knuckle 7 also contains the vertically alined upper and lower bearings 9 and 10.

These bearings are shown as containing the bushings 11 and 12. The upper bushing 11 is surmounted by an outturned collar 13 for encountering the upper end of upper bearing 9 and arresting the downward movement of the bushing 11. The external wall of the upper bushing 11 is substantially cylindrical to fit the similar cylindrical internal wall of bearing 9. The bushing 11 is driven into the bearing 9 or is otherwise forced thereinto in a tight and permanent manner. The internal wall of the upper bushing 11 is inverted frusto-conical in order to agree with the similar wall of a trunnion head 14 which may be formed upon the upper portion of the king pin 15. The lower end of upper bushing 11 may contact the upper part of axle 6 in common with the lower part of the upper bearing 9.

Above the trunnion head 14, the king pin 15 is formed with a nut head 16. Of course the parts 14 and 16 may be made separately and affixed to the king pin 15, but for convenience in manufacture they may be forged or otherwise constructed all in one piece.

The inverted frusto-conical external wall of the trunnion head 14 is traversed by a spiral or other grease groove 17 which receives its supply of lubricant from a grease cup 18 removably carried by the upper bearing 9.

Between the lower part of axle 6 and the upper end of lower bearing 10 is interposed a ball or other bearing 19 upon which the weight of the axle 6 and superincumbent weight of the vehicle body mainly devolve. This ball bearing 9 also rests in part upon the upper thicker end of the lower bushing 12, whose external wall is cylindrical to fit within a like cylindrical wall within the bushing 10 into which it is driven or otherwise secured in a tight non-rotatable and permanent fit. The lower bushing 12 has a base collar 20 extending outwardly therefrom and encountering the lower edge of lower bearing 10.

Figure 5:
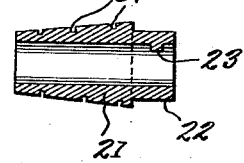
Figure 5 is a longitudinal section taken through the trunnion sleeve.

Slidably mounted on the lower part of the king pin 15 is a trunnion sleeve 21, shown more particularly in Figure 5, the external wall of which is frusto-conical in order to agree, and mate with, the internal frusto-conical wall of the lower bushing 12. The trunnion sleeve 21 carries an extension 22. Within the extension 22 is a key 23 for slidably fitting in a keyway 24, which keyway is made in the lower portion of the king bolt 15 and opens downwardly through the lower end of such king pin in order to admit the hollow sleeve 21 and its extension 22 over such king pin.

Figure 3:
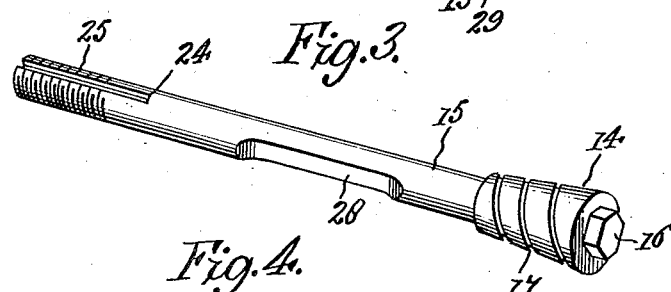
Figure 3 is a perspective view of the improved king pin employed.

The king pin is more particularly shown in Figure 3. The lower end portion of the king pin is threaded, as indicated at 25, in order to accommodate the adjusting nut 26 and the lock nut 27. The extension 22 of trunnion sleeve 21 rests upon adjusting nut 26 and receives the thrust of the adjusting action of the adjusting nut, which thrust is a longitudinal thrust, or a thrust taking place axially along the length of the king pin 15.

Figure 4:
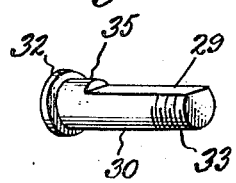
Figure 4 is a similar view of the improved locking bolt employed.

The king pin 15 is also modified in construction in that it is formed with a cut away portion 28 in its intermediate part, such cut away portion having a flat wall to complement the cut away flat wall 29 on the lock bolt 30, shown more particularly in Figure 4.

The lock bolt 30 is passed horizontally through an opening 31 in the axle 6, the head 32 of the same being wider than the diameter of the opening 31 and engaging the side wall of the axle 6 to prevent the casual passage of the lock bolt 30 through the opening 31. The free end of lock bolt 30 is formed with external threads 33 to receive a nut 34, which is adapted to be screwed home against the side of axle 6 opposite to that engaged by bolt head 32.

The shank of lock bolt 30 has a portion adjacent the head 32 which is uninterruptedly cylindrical and into which the cut away portion 29 does not extend. This completely cylindrical section is indicated at 35 and it fits snugly into a complementary cylindrical portion 36 of the opening 31. In this way the lock bolt 30 is centered.

Its flat surface 29 intercepts the flat surface 28 of king pin 15 at an intermediate portion of such flat surface 28. The flat surface 29, viewed transversely of the lock bolt 30, is formed on a chord of the circle which is in effect the outer round wall of lock bolt 30. The length of this chord is a great deal less than the axial length of the flat wall portion 28 on king pin 15. Thus considerable portions of the flat wall 28 of king pin 15 extend above and below flat wall 29 of lock bolt 30.

Due to this construction, while the lock bolt 30 is permanently held in the axle 6 in a fixed and immovable manner, the king pin 15 may be adjusted up and down axially of itself and vertically without interference from the lock bolt 30; at the same time during any and all positions of king pin 15, the flat surfaces 28 and 29 will remain in the same contact thus preventing any rotation on the part of the king pin 15. The bushings 11 and 12 being fixedly carried in the bearings 9 and 10 will rotate with the wheel spindle 8 respectively upon the trunnion head 14 and the trunnion sleeve 21.

The trunnion sleeve 21, as to its outer frusto-conical surface, is traversed by a spiral or other form of grease groove 37 which communicates at a suitable point in its length with a grease cup 38 or other source of lubricant supply.

In the use of the device, heretofore in the course of use, the king bolt wears and becomes loose and moves around in the bushings, thereby causing "shimmying." Heretofore, in order to repair this condition, it was necessary to remove the king bolt, insert a new set of bushings and put in a new king bolt, requiring the taking apart of the entire front arm assembly in order to do this work. This caused an extensive process, requiring not only the use of new parts but of labor.

In accordance with the present invention as wear takes place from time to time an adjustment may be made in the following manner. The lock nut 27 is first backed downwardly away from the adjusting nut 26 which is thereupon rotated in a right hand manner, or in a manner to move longitudinally along king pin 15 toward trunnion sleeve 21. This action will not only cause the trunnion sleeve 21 to advance further into the conical internal wall of the lower bushing 12 but it will draw down the trunnion head 14 further into the inverted conical wall of upper bushing 11.

In other words the single adjustment of the adjusting nut 26 will simultaneously cause the tightening of the king pin trunnions in both upper and lower bushings 11 and 12. During this adjustment the key 23 will slide in the keyway 24, allowing the trunnion sleeve 21 to progress axially along the king pin 15 without encountering any obstacles. The adjustment causes the king pin 15 to be drawn down axially through the axle 6, and therefore the lower end of the trunnion head 14 will terminate initially above the upper end of axle 6.

During the adjustment the flat face 28 of the king pin will slide down upon and across the flat face 29 of the locking bolt 30.

After the adjustment has been effected the lock nut 27 is run up and jammed against the adjusting nut 26 whereby the adjustment will remain permanent.

Therefore the single action of adjustment causes the tapered portions to be again fitted snugly into the bushings and consequently no "shimmying" can occur. As wear takes place again, a new adjustment can be made, forcing the trunnion members further into the permanent bushings; and consequently, by repeating the process, the life of the king bolt and bushings will be equal to the life of the car itself. It will take only a very few minutes to make the adjustment, creating an inexpensive job.

It will also be noted that the king bolt is able to move by the lock bolt 30, permitting the king bolt to be firmly attached to the axles at all times, and making it unnecessary to remove the locking bolt D to permit the tightening process.

It will be appreciated that the invention creates a king bolt and bushings assembly to be used in steering assemblies of vehicles which are permanent in nature. Neither the king bolt nor the bushings need ever be replaced for the entire life of the vehicle. No replacement of parts is necessary. In fact all of the parts remain permanently in their positions.

The only requirement is that the nuts on the bottom of the king bolt be tightened. This is a matter of but a few minutes work and does not need the intervention of any one who is mechanically trained, but can be done by the ordinary layman possessing a wrench. The cost of rebushing and replacing the king bolt is eliminated together with the cost of the labor involved. Furthermore the problem of getting parts is dispensed with.

It is a known fact that under the present construction, not only does the king bolt wear, but the arm where the bushing fits also wears as well as the bushing itself. Thereby it is sometimes a difficult job to secure bushings and king pins which will fit securely enough to eliminate "shimmying."

Very often under the present construction it is impossible to eliminate "shimmy" even though new king bolts and bushing are applied. Under the invention however "shimmying" will necessarily be eliminated, since merely by tightening the nuts the king bolts become firmly affixed to the bushings. The bushings being permanently attached to the arm by virtue of the shoulders or collars 13 and 20 cannot wear against the arm but can only wear on the inside where the king bolt fits. This wear is overcome by virtue of the adjustment of cone-shaped ends of the king bolt which fit into the tapered or cone-shaped bushings and form a snug fit.

In the case of this invention, the cost of manufacturing is very slight as compared to the cost of manufacturing the present conventional assembly. The only cost is involved in the construction of the lathe in order to cut out the king bolt and the bushings. There is no extra cost as to labor. The king bolts and bushings can be made up in any size to fit any car and are of a simple construction. The nut head 16 may receive a wrench for the purpose of rotating the king bolt 15 to line up its cut away portion 28 with the cut away portion of the lock bolt 30.

It is obvious that various changes and modifications may be made in the details of construction and design of the above specifically described embodiment of this invention without departing from the spirit thereof, such changes and modifications being restricted only by the scope of the following claims.

What is claimed is:

1. In combination with a vehicle axle and a front steering knuckle having upper and lower bearings, bushings non-rotatably fitted to said bearings and having inversely disposed frusto-conical internal bearing walls, a king pin adjustable axially through said bearings and axle, a trunnion head on said king pin having a frusto-conical surface for mating with the conical internal wall of the upper bushing, a trunnion sleeve slidable on said king pin while non-rotatably locked thereto, said sleeve having a conical surface mating with the similar surface wall of the lower bushing, and means for drawing said king pin axially downward together with its trunnion head and simultaneously engaging and moving said trunnion sleeve upwardly whereby to tighten the trunnion head and trunnion sleeve in said bushings.

2. In combination with a vehicle axle and a front steering knuckle having upper and lower bearings, bushings non-rotatably fitted to said bearings and having inversely disposed frusto-conical internal bearing walls, a king pin adjustable axially through said bearings and axle, a trunnion head on said king pin having a frusto-conical surface for mating with the conical internal wall of the upper bushing, a trunnion sleeve slidable on said king pin while non-rotatably locked thereto, said sleeve having a conical surface mating with the similar surface wall of the lower bushing, and means for drawing said king pin axially downward together with its trunnion head and simultaneously engaging and moving said trunnion sleeve upwardly whereby to tighten the trunnion head and trunnion sleeve in said bushings, and lock means between the axle and said king pin for engaging the king pin to prevent turning thereof but allowing the free vertical movement of the king pin with reference to said last means.

3. In combination with a vehicle axle and a front steering knuckle having upper and lower bearings, bushings non-rotatably fitted to said bearings and having inversely disposed frusto-conical internal bearing walls, a king pin adjustable axially through said bearings and axle, a trunnion head on said king pin having a frusto-conical surface for mating with the conical internal wall of the upper bushing, a trunnion sleeve slidable on said king pin while non-rotatably locked thereto, said sleeve having a conical surface mating with the similar surface wall of the lower bushing, means for drawing said king pin axially downward together with its trunnion head and simultaneously engaging and moving said trunnion sleeve upwardly whereby to tighten the trunnion head and trunnion sleeve in said bushings, and locking means for locking the last named means and the king pin in position after adjustment.

4. In a front wheel assembly, the combination of an axle, a steering knuckle having upper and lower bearings, bushings having outturned flanges fitting against the end portions of said bearings and non-rotatably held in said bearings, a king pin extending through said bushings and axle, an inverted frusto-conical trunnion head on said king pin fitting adjustably in the upper bushing, a nut head on the king pin above said trunnion head, said king pin having a keyway in its lower portion and having a threw threaded portion about the keyway, a trunnion sleeve having an extension part provided with a key movable in said keyway, said trunnion sleeve extending adjustably into the lower bushing, and a nut run on the threads of the king pin in thrust relation to said sleeve extension for causing the axial shifting of the king pin and the drawing of the trunnion head and trunnion sleeve together in said bushings.

WALTER F. JONES.